(12) United States Patent
Hirota

(10) Patent No.: US 9,618,071 B2
(45) Date of Patent: Apr. 11, 2017

(54) ENGINE MOUNT STRUCTURE FOR APPARATUS EQUIPPED WITH ENGINE

(71) Applicant: FUJI JUKOGYO KABUSHIKI KAISHA, Tokyo (JP)

(72) Inventor: Kentaro Hirota, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/177,704

(22) Filed: Feb. 11, 2014

(65) Prior Publication Data

US 2014/0252704 A1     Sep. 11, 2014

(30) Foreign Application Priority Data

Mar. 5, 2013   (JP) .................................. 2013-043045

(51) Int. Cl.
    *F16F 1/36*     (2006.01)
    *B60K 5/12*    (2006.01)

(52) U.S. Cl.
    CPC .......... *F16F 1/3605* (2013.01); *B60K 5/1208* (2013.01)

(58) Field of Classification Search
    CPC .. F16F 1/3605; F16F 1/44; F16F 1/373; F16F 1/3732; F16F 1/36; F16F 15/08; B60K 5/1208; B60K 5/1225
    USPC .................................. 267/140.3, 140.4, 141
    See application file for complete search history.

(56) References Cited

U.S. PATENT DOCUMENTS

| | | | | |
|---|---|---|---|---|
| 2,224,648 | A * | 12/1940 | Haadem | 267/140.4 |
| 2,353,944 | A * | 7/1944 | Storch | 267/141 |
| 2,638,303 | A * | 5/1953 | Pietz | 267/140.3 |
| 3,079,132 | A * | 2/1963 | Tiegel | F16F 1/3732 165/185 |
| 4,971,496 | A * | 11/1990 | Scholz | B64C 1/066 411/105 |
| 5,265,552 | A * | 11/1993 | Taylor | 114/219 |
| 5,295,755 | A * | 3/1994 | DeHaan et al. | 403/291 |
| 5,364,061 | A * | 11/1994 | Ciolczyk et al. | 248/610 |
| 5,788,206 | A * | 8/1998 | Bunker | B60K 17/00 248/634 |
| 6,053,272 | A * | 4/2000 | Koyanagi et al. | 180/299 |
| 6,719,482 | B2 * | 4/2004 | Morita | 403/408.1 |
| 7,246,797 | B2 * | 7/2007 | Gustavsson | 267/141.4 |
| 7,273,128 | B2 * | 9/2007 | Niwa et al. | 181/209 |
| 7,350,777 | B2 * | 4/2008 | Ogawa et al. | 267/141.1 |

(Continued)

FOREIGN PATENT DOCUMENTS

JP    11-082043 A    3/1999

*Primary Examiner* — Anna Momper

(74) *Attorney, Agent, or Firm* — McDermott Will & Emery LLP

(57) ABSTRACT

An engine mount structure for an apparatus equipped with an engine mounts an engine on a resin casing with an elastic body therebetween. The structure includes: a base plate arranged so that one side thereof faces the engine and the other side thereof faces the casing; a cylindrical elastic body that protrudes toward the engine from the base plate and is provided at an end portion thereof on an engine side with a securing member on which the engine is fixed; and a bolt that protrudes toward the casing from the base plate and couples the casing and the base plate to each other. An area where the bolt is disposed on the base plate protrudes in a stepped shape toward the engine from an area where the elastic body is disposed on the base plate.

5 Claims, 3 Drawing Sheets

(56) References Cited

U.S. PATENT DOCUMENTS

| | | | |
|---|---|---|---|
| 2004/0150147 A1* | 8/2004 | Schafer | 267/141 |
| 2004/0262831 A1* | 12/2004 | Maeno et al. | 267/140.13 |
| 2005/0017421 A1* | 1/2005 | Huprikar | 267/141 |
| 2006/0043654 A1* | 3/2006 | Allaei | 267/140.3 |
| 2006/0244188 A1* | 11/2006 | Johnson et al. | 267/293 |
| 2008/0237953 A1* | 10/2008 | Tanaka et al. | 267/141 |
| 2009/0152781 A1* | 6/2009 | Yoshii et al. | 267/141 |
| 2012/0049426 A1* | 3/2012 | Sakata | 267/141 |
| 2012/0319337 A1* | 12/2012 | Kato et al. | 267/141 |
| 2013/0119592 A1* | 5/2013 | Erl | F16F 1/3737 267/220 |

\* cited by examiner

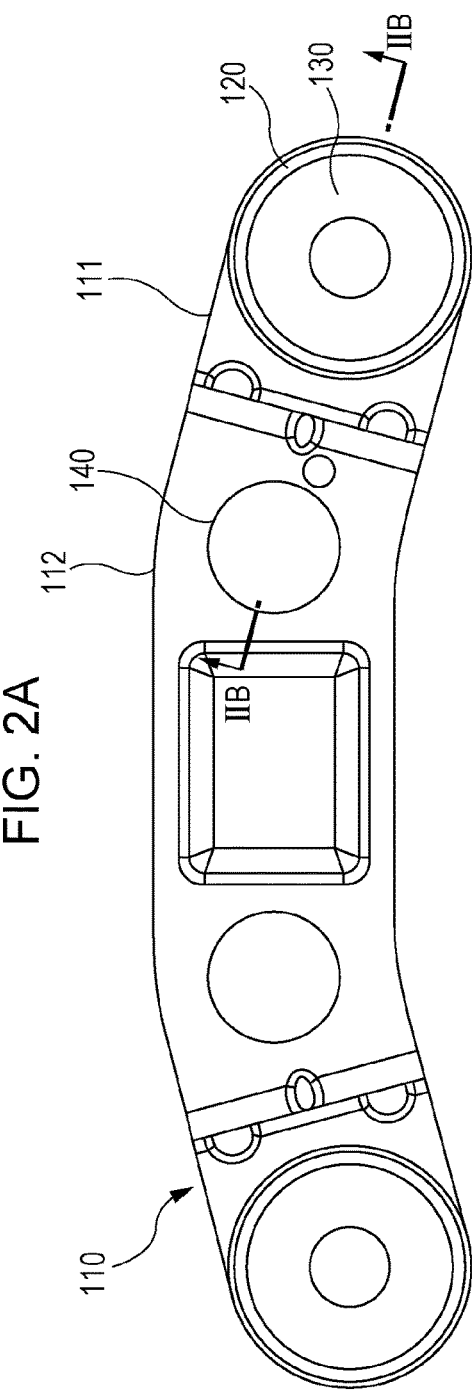
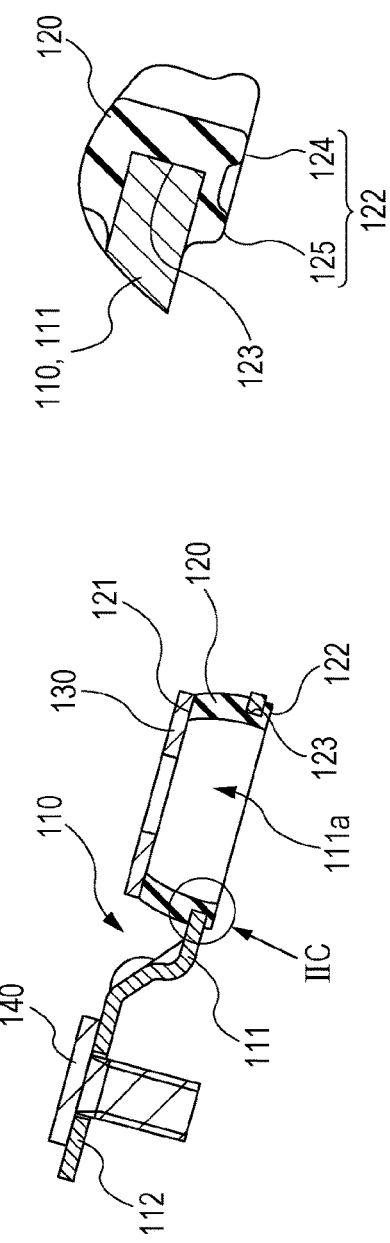
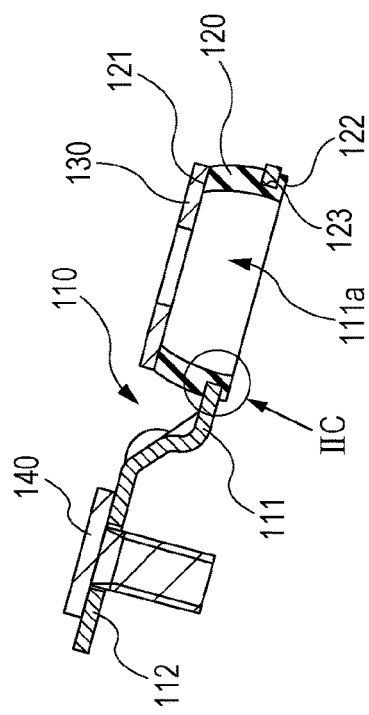
FIG. 2A
FIG. 2B
FIG. 2C

ENGINE MOUNT STRUCTURE FOR APPARATUS EQUIPPED WITH ENGINE

CROSS REFERENCES TO RELATED APPLICATIONS

The present application claims priority from Japanese Patent Application No. 2013-043045 filed on Mar. 5, 2013, the entire contents of which are hereby incorporated by reference.

BACKGROUND

1. Technical Field

The present invention relates to an engine mount structure for an apparatus equipped with an engine and more particularly relates to an engine mount structure that makes it possible to reduce the size of the apparatus.

2. Related Art

In a portable apparatus equipped with a general-purpose engine such as a portable electric generator, the engine is disposed on a frame or the like with an elastic body such as a vibration-reducing rubber therebetween.

As an example of the related art concerning such an engine mount structure for an apparatus equipped with an engine, Japanese Unexamined Patent Application Publication No. H11-82043 discloses a portable electric generator in which an engine, an electric generating device, a fuel tank, and the like are attached to a frame made of pipes, and in which a cylindrical vibration-reducing rubber is disposed between a lower portion of the frame and a bottom surface of the engine and a bolt is inserted into an aperture of the vibration-reducing rubber so as to fasten the engine to the frame.

Recently, it has been becoming increasingly common for housings (casings) of electric generators or the like to be formed as capsule-type structures made of a resin. In an apparatus equipped with an engine and having such a resin casing, for example, the vibration-reducing rubber is disposed on the top surface of a metallic base plate formed by a pressing process, the engine is mounted on the vibration-reducing rubber, and a bolt that protrudes downward from the base plate fastens the casing to the base plate.

However, in the engine mount structure in which the elastic body protrudes from one side of the base plate and the bolt protrudes from the other side of the base plate, the base plate increases in size in the thickness direction (usually, a vertical direction) and consequently the outer dimensions of the apparatus equipped with the engine increase.

SUMMARY OF THE INVENTION

In view of the above problems, an example of an object of the present invention is to provide an engine mount structure that can be used in an apparatus equipped with an engine and that makes it possible to reduce the size of the apparatus.

In order to achieve the above object, an aspect of the present invention provides an engine mount structure for an apparatus equipped with an engine, the engine mount structure being configured to mount an engine on a casing made of a resin with an elastic body therebetween. The engine mount structure includes: a base plate arranged so that one side thereof faces the engine and the other side thereof faces the casing; an elastic body made of an elastic material and formed into a cylindrical shape, the elastic body being disposed so as to protrude toward the engine from the base plate and being provided at an end portion thereof on an engine side with a securing member to which the engine is fixed; and a bolt that protrudes toward the casing from the base plate and that couples the casing and the base plate to each other. An area where the bolt is disposed on the base plate is arranged so as to protrude in a stepped shape toward the engine from an area where the elastic body is disposed on the base plate.

An end portion of the elastic body on a casing side may protrude toward the casing from the base plate and comes into contact with the casing. Ribs may be provided around the elastic body at a contact position between the elastic body and the casing.

Further, a projection may be provided on the casing at a contact position between the elastic body and the casing so as to be inserted into an aperture of the elastic body.

BRIEF DESCRIPTION OF THE DRAWINGS

FIG. 2A is a plan view of a base plate in the engine mount structure illustrated in FIG. 1, illustrating the base plate to which a vibration-reducing rubber or the like is attached and which is viewed from an engine side;

FIG. 2B is a longitudinal sectional view of part of the base plate taken from a line IIB-IIB in FIG. 2A;

FIG. 2C is an enlarged sectional view of part of the base plate in a circular area IIC in FIG. 2B.

DETAILED DESCRIPTION

An implementation of an engine mount structure for an apparatus equipped with an engine (hereinafter merely referred to "an engine mount structure") according to the present invention will be described with reference to the drawings In the implementation of the invention, an apparatus equipped with an engine is a portable engine generator that contains a device such as a general-purpose engine, an electric generator, a fuel tank, and a controller in a casing made of a resin.

Figure 1:
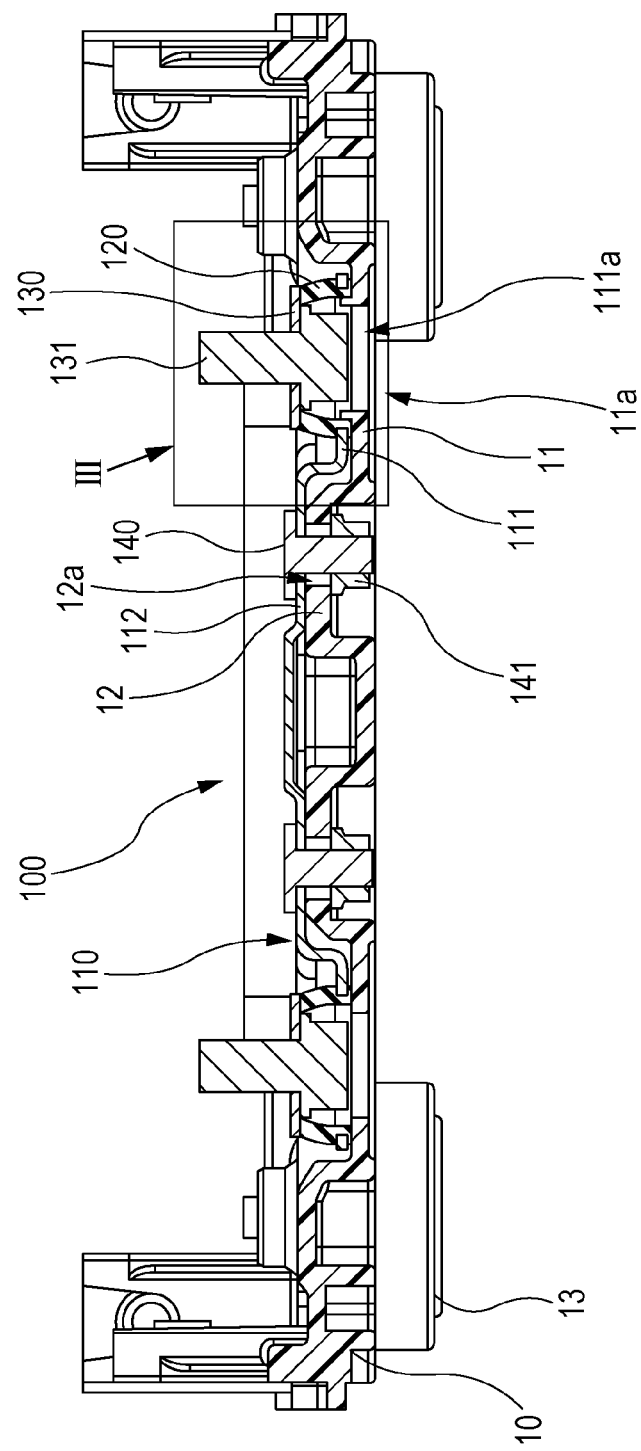
FIG. 1 is a longitudinal sectional view of an engine mount structure for an apparatus equipped with an engine in accordance with an implementation of the invention.
Figure 3:
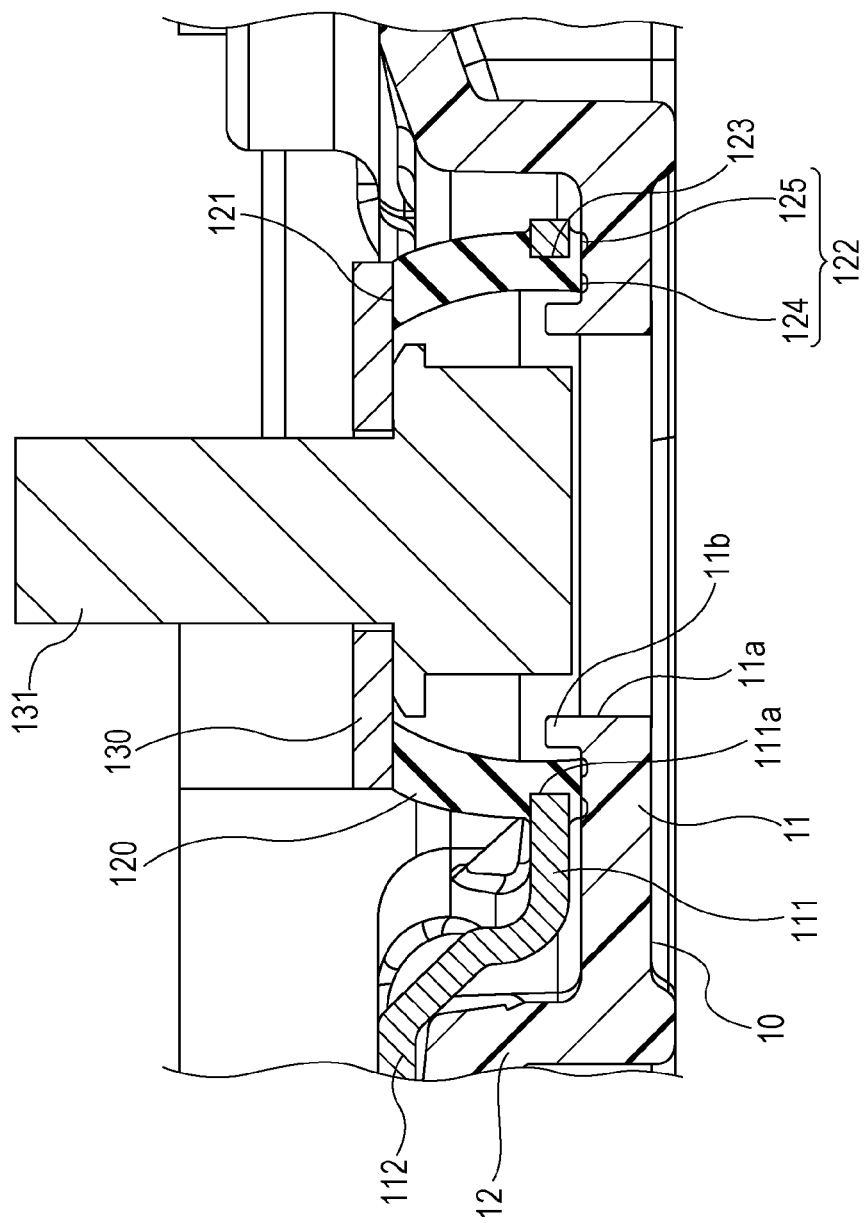
FIG. 3 is an enlarged sectional view of part of the engine mount structure in an area indicated by an arrow III in FIG. 1.

As illustrated in FIG. 1 through FIG. 3, an engine mount structure 100 is used to secure an engine (not illustrated) to the top of a casing base 10. The engine mount structure 100 includes a base plate 110, a vibration-reducing rubber (an elastic body) 120, an engine attachment boss 130, a welding bolt 140, and the like.

The casing base 10 constitutes a lower section (a bottom section) of the resin casing that contains an engine, a fuel tank, an electric generator, a controller, and the like. The casing base 10 is formed integrally by, for example, a molding process in which a resin material is injected into a mold. The casing base 10 includes a bottom portion 11, a base plate fastening wall 12, a leg 13, and the like.

The bottom portion 11 has a flat plate-like shape, is provided on a lower section of the casing base 10, and extends in a substantially horizontal direction. An aperture 11a is provided in the bottom portion 11 so as to receive a bolt 131 that is used to fasten an engine to the bottom portion 11. In the implementation illustrated in FIG. 1, a pair of apertures 11a are provided in the bottom portion 11 and a projection 11b is provided around one of the apertures 11a.

The projection 11b is provided around the entire periphery of the aperture 11a and protrudes upward from the bottom portion 11. The projection 11b is inserted into an aperture of a lower end 122 of the vibration-reducing rubber 120 so as to position the vibration-reducing rubber 120.

A casing fastening wall 112 of the base plate 110 is secured to the base plate fastening wall 12. The base plate fastening wall 12 protrudes in a stepped shape upward (toward an engine side) from the bottom portion 11. The aperture 12a is provided in the base plate fastening wall 12 so as to receive the welding bolt 140.

The leg 13 protrudes downward from a bottom surface of the bottom portion 11 so as to support an electric generator.

The base plate 110 is secured to the casing base 10 and is fixed to the engine with the vibration-reducing rubber 120 therebetween. The base plate 110 is formed integrally by a sheet metal working such as press forming of a steel sheet. The base plate 110 includes a vibration-reducing-rubber holding wall 111, a casing fastening wall 112, and the like. In the implementation, a pair of vibration-reducing-rubber holding walls 111 are provided on both sides of the casing fastening wall 112.

As illustrated in FIG. 2A, the base plate 110 is a strip plate that has a bow-shaped structure. The vibration-reducing-rubber holding walls 111 are provided on opposite ends of the base plate 110. Each vibration-reducing-rubber holding wall 111 has a flat plate-like shape that substantially extends parallel to the bottom portion 11 of the casing base 10.

As illustrated in FIG. 3, the vibration-reducing-rubber holding wall 111 is spaced apart from and is disposed parallel to the bottom portion 11. An aperture 111a is provided in the vibration-reducing-rubber holding wall 111 so as to receive the vibration-reducing rubber 120.

The casing fastening wall 112 is a flat plate that extends substantially parallel to the vibration-reducing-rubber holding wall 111 and that protrudes in a stepped shape toward the engine side (upward in the implementation) from the vibration-reducing-rubber holding wall 111. As illustrated in FIG. 3, the top surface of the casing fastening wall 112 is slightly lower than the top surface of an engine attachment boss 130 so that the casing fastening wall 112 is spaced apart from and opposes a bottom surface of the engine when the wall 112 is attached to the electric generator. In the implementation, the casing fastening wall 112 is provided with, for example, a pair of apertures each of which receives the welding bolt 140.

The vibration-reducing rubber 120 is made of a material having viscoelasticity such as a rubber so as to suppress transmission of vibrations between the engine and the base plate 110. The vibration-reducing rubber 120 has a cylindrical shape with a center axis disposed substantially perpendicular to the vibration-reducing-rubber holding wall 111 of the base plate 110. The vibration-reducing rubber 120 is a bevel-like elastic body having an upper end 121 which is smaller in diameter than a lower end 122.

A peripheral groove 123 is provided on a whole outer periphery of the vicinity of a lower end 122 of the vibration-reducing rubber 120. A peripheral edge around the aperture 111a in the vibration-reducing-rubber holding wall 111 of the base plate 110 is engaged with the peripheral groove 123. When the vibration-reducing rubber 120 is coupled to the base plate 110 so that an inner peripheral edge around the aperture 111a in the vibration-reducing-rubber holding wall 111 is engaged with the peripheral groove 123, the upper end 121 of the vibration-reducing rubber 120 protrudes upward over the vibration-reducing-rubber holding wall 111 while the lower end 122 of the vibration-reducing rubber 120 protrudes downward over the vibration-reducing-rubber holding wall 111.

As illustrated in FIG. 2C and FIG. 3, ribs 124 and 125 are provided on a bottom surface of the lower end 122 of the vibration-reducing rubber 120. The rib 124 protrudes downward from an inner peripheral edge on the bottom surface of the lower end 122. The rib 125 protrudes downward from an outer peripheral edge on the bottom surface of the lower end 122. The ribs 124 and 125 are provided on the entire periphery of the vibration-reducing rubber 120. As illustrated in FIG. 2C, sectional shapes of the ribs 124 and 125 taper from proximal ends (upper ends) to distal ends (lower ends). When the casing base 10 is coupled to the electric generator, the lower ends of the ribs 124 and 125 are pressed onto the bottom portion 11 of the casing base 10. At this time, the ribs 124 and 125 are elastically compressed in a vertical direction.

The engine attachment boss 130 is directly coupled to the engine. The engine attachment boss 130 is formed into a disc-like shape by, for example, a sheet metal working and is provided at its center with an aperture for receiving a bolt 131 that is used to fasten the engine to the boss 130. The engine attachment boss 130 is secured to the upper end 121 of the vibration-reducing rubber 120 by a vulcanized adhesive or the like. The engine attachment boss 130 is fastened to the engine by inserting the bolt 131 into the boss 130 from an under side.

The welding bolt 140 is used to couple the base plate 110 and the casing base 10 to each other. The welding bolt 140 includes an external thread portion that substantially extends in a vertical direction and a disc-like flange portion provided on an upper end of the external thread portion. When the external thread portion of the welding bolt 140 is inserted downward into the aperture in the casing fastening wall 112 and is made to protrude from the bottom surface of the casing fastening wall 112, the flange portion of the welding bolt 140 is secured to the casing fastening wall 112 by welding. As illustrated in FIG. 1, the welding bolt 140 is inserted into the aperture 12a in the base plate fastening wall 12 of the casing base 10 and is fastened on the bottom surface of the casing base 10 by a nut 14 from an under side.

As described above, the implementation can obtain the following effects.

(1) Since the casing fastening wall 112 of the base plate 110 protrudes in a stepped shape toward the engine and from the vibration-reducing-rubber holing wall 111, it is possible to dispose the vibration-reducing rubber 120 and the welding bolt 140 so that they overlap in the thickness direction of the base plate 110, thereby decreasing the height of the engine mount structure 100 and also decreasing the overall height of the electric generator. Also, in the case where the height of the electric generator is a typical height for electric generators, it is possible to mount an engine having a larger cylinder volume and to exert the same horsepower as an engine having a smaller cylinder volume by using a rotational speed that is lower than that of the engine having the smaller cylinder volume. Accordingly, it is possible to reduce noise while maintaining a level of the horsepower.

(2) Since the O-ring type ribs 124 and 125 are provided on the lower end 122 of the vibration-reducing rubber 120, deviations in the relative positions of the bottom portion 11 and the vibration-reducing rubber 120 on account of dimensional tolerances of the base plate 110 and the casing base 10 can be reduced by the ribs 124 and 125 deforming by a certain amount. Consequently, it is possible to prevent the base plate 110 from colliding against the casing base 10 and thereby causing collision noise during operation of the engine when there is a clearance between the vibration-reducing rubber 120 and the casing base 10, or it is possible to prevent the vibration-reducing rubber 120 from excessively pressing against the casing base 10 and thereby causing deformation or breakage of the casing base 10.

(3) Since the casing base 10 is provided around the aperture 11a in the bottom portion 11 of the casing base 10 with the projection 11b to be inserted into the aperture of the lower end 122 of the vibration-reducing rubber 120, it is easy to position the base plate 110, to which the vibration-reducing rubber 120 is attached, with respect to the casing base 10, thereby improving workability in assembly work and the precision of products.

Modified Examples

It should be noted that the invention is not limited to the implementation described above and that various alterations and modifications fall within the technical scope of the invention.

For example, shapes, structures, materials, and producing methods of the respective members that constitute the engine mount structure, and numbers and positions of the respective fastening members and elastic bodies are not limited to the above implementation. These items may be altered suitably, as required.

Also, although the engine mount structure is disposed on a lower part of the engine in the above implementation so that the central axes of the respective bolts and the like extend in a substantially vertical direction, the bolts and the like may be inclined or may support another part of the engine.

Although an example of the apparatus equipped with the engine is the electric generator in the above implementation, this is not limited. The invention can be applied to any apparatus having a different use.

The invention claimed is:

1. An engine mount structure for an apparatus equipped with an engine, the engine mount structure being configured to mount an engine on a casing made of a resin with an elastic body therebetween, the engine mount structure comprising:

a base plate disposed so that one side thereof faces the engine and the other side thereof faces the casing;

an elastic body made of an elastic material and formed into a cylindrical shape, the elastic body being disposed so as to protrude toward the engine from a vibration-reducing-rubber holding wall, which is formed in a protruded shape toward the casing, and being provided at an end portion of the vibration-reducing-rubber holding wall on an engine side with a securing member to which the engine is fixed; and a casing fastening wall of the base plate providing an aperture for inserting a bolt for coupling the casing and the base plate to each other, wherein:

the casing fastening wall of the base plate is formed in a protruded shape toward the engine with respect to the vibration-reducing-rubber holding wall, and the vibration-reducing-rubber holding wall links the elastic body to the casing fastening wall so as to be connectively arranged therebetween.

2. The engine mount structure for an apparatus equipped with an engine according to claim 1, wherein an end portion of the elastic body on a casing side protrudes toward the casing from the base plate and comes into contact with the casing; and ribs are provided around the elastic body at a contact position between the elastic body and the casing.

3. The engine mount structure for an apparatus equipped with an engine according to claim 2, wherein a projection is provided on the casing at a contact position between the elastic body and the casing so as to be inserted into an aperture of the elastic body.

4. The engine mount structure for an apparatus equipped with an engine according to claim 1, wherein the base plate includes a first area where the bolt is disposed on and a second area where the elastic body is disposed on, and the first area protrudes in a stepped shape toward the engine with respect to the second area such that the first area is located closer to the engine than the second area.

5. The engine mount structure for an apparatus equipped with an engine according to claim 1, wherein the vibration-reducing-rubber holding wall includes a first portion extending from the elastic body and a second portion extending to the casing fastening wall, the second portion is closer to the engine than the first portion.

* * * * *